Figure 1:
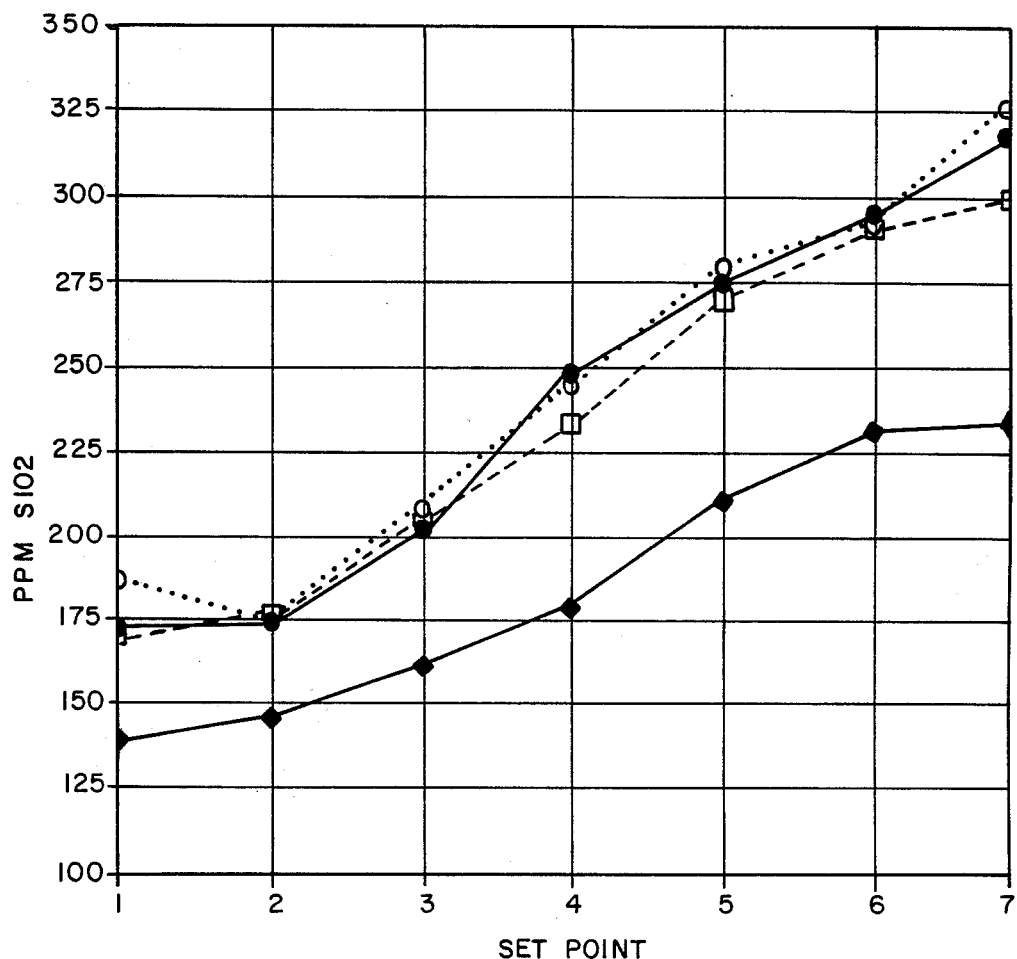

United States Patent [19]

Dubin

[11] Patent Number: 4,584,104
[45] Date of Patent: * Apr. 22, 1986

[54] SILICA INHIBITION: PREVENTION OF SILICA DEPOSITION BY BORIC ACID/ORTHOBORATE ION

[75] Inventor: Leonard Dubin, Skokie, Ill.

[73] Assignee: Nalco Chemical Company, Oakbrook, Ill.

[*] Notice: The portion of the term of this patent subsequent to Jul. 30, 2002 has been disclaimed.

[21] Appl. No.: 626,348

[22] Filed: Jun. 29, 1984

[51] Int. Cl.⁴ .................................................. C02F 5/08
[52] U.S. Cl. ...................................... 210/696; 210/697; 210/699; 252/181; 252/389 R; 422/15; 422/18; 422/19
[58] Field of Search ........................ 210/696, 697–701; 252/180, 181, 389.4, 389.41; 422/13, 15, 18, 19

[56] References Cited

U.S. PATENT DOCUMENTS

| | | | |
|---|---|---|---|
| 2,805,915 | 9/1957 | Rohrback | 210/696 |
| 3,284,319 | 11/1966 | Hill | 252/389.4 |
| 3,436,350 | 10/1969 | Schwedler | 252/135 |
| 3,639,279 | 2/1972 | Gardner et al. | 252/180 |
| 3,671,447 | 6/1972 | Kowalski | 210/698 |
| 3,671,448 | 6/1972 | Kowalski | 210/700 |
| 3,770,413 | 11/1973 | Tabor et al. | 252/389.4 |
| 3,852,213 | 12/1974 | Cooney | 210/698 |
| 3,948,792 | 4/1976 | Watsen et al. | 210/700 |
| 4,000,083 | 12/1976 | Heesen | 252/181 |
| 4,328,106 | 5/1982 | Harrar et al. | 210/700 |
| 4,344,862 | 8/1982 | Widder et al. | 252/389.41 |
| 4,405,461 | 9/1983 | Rogers | 210/698 |

OTHER PUBLICATIONS

Weres, O., Yee, A., Tsao, L., Kinetics of Silica Polymerization, May, 1980, University of California, Lawrence Berkely Laboratory Earth Science Division, U.S. Dept. of Energy Contract W-7405-Eng-48.
Iler, Ralph K., The Chemistry of Silica, New York, John Wiley and Sons, 1979.
On-Line Tests of Organic Additives for the Inhibition of the Precipitation of Silica from Hypersaline Geothermal Brine by Jackson, E. Harrar and others, Apr. 3, 1979, U.S. Government Contract Report *UCID-18091.
Field Tests of Organic Additives for Scale Control at the Salton Sea Geothermal Field by Harrar, J. E., and others, Society of Petroleum Engineers Journal, Feb. 1982, pp. 17–27.
On-Line Tests of Organic Additives for the Inhibition of the Precipitation of Silica from Hypersaline Geothermal Brine IV, Final Tests of Candidate Additives, by Jackson E. Harrar and others, Feb. 1980, University of California, Lawrence Livermore, Report UCID-18536.
Final Report on Tests of Proprietary Chemical Additives as Antiscalants for Hypersaline Geothermal Brine, by J. E. Harrar and others, Lawrence Livermore Laboratory, Jan. 1980, Report #UCID-18521.
On-Line Tests of Organic Additives for the Inhibition of the Precipitation of Silica from Hypersaline Geothermal Brine III, Scaling Measurements and Tests of other Methods of Brine Modification by J. E. Harrar and others, Report #UCID-18238.
Meutterties, The Chemistry of Boron and its Compounds, New York, John Wiley and Sons, 1980.
Cotton, F., Albert and Wilkinson, Geoffrey, Advanced Inorganic Chemistry, New York, John Wiley and Sons, 1980.

Primary Examiner—Peter Hruskoci
Attorney, Agent, or Firm—John G. Premo; Donald G. Epple

[57] ABSTRACT

A method of inhibiting amorphous silica scale formation on surfaces in contact with industrial waters containing dissolved silicates is disclosed. The method involves treating the industrial waters with a boron compound which dissolves in or hydrolyzes in these industrial waters to give the orthoborate ion. The preferred boron compound is boric acid, its salts, or precursors.

8 Claims, 2 Drawing Figures

SILICA SCALE INHIBITION—NO TREATMENT
(PILOT COOLING TOWER, PH-7)

···O··· UNFILTERED SIO2, TOTAL
--◇-- SIO2 FILTERED, TOTAL
—◆— REACTIVE SIO2
—●— THEORETICAL CYCLES (K+)

SILICA INHIBITION: PREVENTION OF SILICA DEPOSITION BY BORIC ACID/ORTHORBORATE ION

INTRODUCTION

Amorphous silica scales cause significant fouling problems when industrial waters contain high quantities of silica. For the most part, high quantities of silica means that the industrial waters contain at least 5.0 ppm and up to about 1000 ppm dissolved silica and may contain higher quantities of silica either in dissolved or dispersed or even, perhaps, colloidal forms.

At the present time, there does not appear to be any commercially available treatment for controlling this amorphous silica fouling in industrial waters which are used for heat exchange purposes, for example cooling waters for downhole drilling waters in the recovery of petroleum crudes, for geothermal applications in boiler waters, or in seawater evaporators and other distillation-type techniques. We have developed a test which allows us to screen and identify useful chemical treatments for inhibiting amorphous silica deposition, scale formation, precipitation, and the like. Various chemical treatments have been found which are useful inhibitors for the formatin of amorphous silica scale, and these will be described later.

It is an object of this invention to describe and disclose the chemical treatments which inhibit amorphous silica deposition, amorphous silica scale formation, and silica precipitation from industrial waters containing high quantities of silica.

Another object of this invention is to present a method of inhibiting amorphous silica scale formation on surfaces in contact with industrial waters which comprises treating these waters with effective amounts, for the purpose of inhibiting amorphous silica scale formation, of various chemical treating agents.

It is also an object of this invention to present a method of inhibiting amorphous silica scale formation on heat exchange surfaces in contact with industrial waters containing high concentrations of silica which comprises treating these industrial waters with effective amounts, for the purpose of inhibiting amorphous silica scale formation on these heat exchange surfaces, of various treating agents to accomplish this inhibition.

PRIOR ART

Schwedler, in U.S. Pat. No. 3,436,350, teaches a method of preventing silica bake-on deposits when using highly concentrated silicate detergent compositions on glassware and the like. He claims a method of preventing bake-on deposits from mechanical dishwashing machine detergents which contain alkali metal silicates wherein the silicates are selected from the group consisting of orthosilicate, metasilicate, and the like, which consists of adding to these detergents a boron-containing compound selected from the group consisting of boric acid and all metal borates wherein the boric acid or metal borate is present at least at stoicimetric amounts sufficient to convert crystalline silicates to the disilicates when the mixture is dissolved in water. This would normally require at least a 2:1 mole ratio of metasilicate to borate-containing compound. These detergents may also be used as steam cleaning compounds for the industrial cleansing of glass surfaces. U.S. Pat. No. 3,436,350 is incorporated herein by reference.

In addition, applicant is aware of the following references which discuss generally the kinetics of silica for polymerization, the chemistry of silica in general, and some online tests of various organic additives for inhibition of precipitation of silica from hypersaline geothermal brines. These references are listed in the following bibliography:

1. Weres, O., Yee, A., Tsao, L., *Kinetics of Silica Polymerization*, May 1980, University of California, Lawrence Berkely Laboratory Earth Science Division, U.S. Dept. of Energy Contract W-7405-Eng-48.
2. Iler, Ralph K., *The Chemistry of Silica,* New York, John Wiley and Sons, 1979.
3. On-Line Tests of Organic Additives for the Inhibition of the Precipitation of Silica from Hypersaline Geothermal Brine by Jackson, E. Harrar and others, April 3, 1979., U.S. government contract Report #UCID-18091.
4. Field Tests of Organic Additives for Scale Control at the salton Sea Geothermal Field by Harrar, J. E., and others, *Society of Petroleum Engineers Journal,* Feb. 1982, pp. 17–27.
5. On-Line Tests of Organic Additives for the Inhibition of the Precipitation of Silica from Hypersaline Geothermal Brine IV. Final Tests of Candidate Additives, by Jackson E. Harrar and others, Feb. 1980, University of California, Lawrence Livermore, Report UCID-18536.
6. Final Report on Testsof Proprietary Chemical additives as Antiscalants for Hypersaline Geothermal Brine, by J. E. Harrar and others, Lawrence Livermore Laboratory, Jan. 1980, Report #UCID-18521.
7. On-Line Tests of Organic Additives for the Inhibition of the Precipitation of Silica from Hypersaline Geothermal Brine III. Scaling Measurements and Tests of Other Methods of Brine Modification, by J. E. Harrar and others, Report #UCID-18238.
8. Meutterties, The Chemistry of Boron and its Compounds, New York, John Wiley and Sons, 1967.
9. Cotton, F., Albert and Wilkinson, Geoffrey, Advanced Inorganic Chemistry, New York, John Wiley and Sons, 1980.

Each of these previous nine (9) references are incorporated herein by reference.

THE INVENTION

I have discovered a method of inhibiting amorphous silica scale formation on surfaces in contact with industrial waters containing silica which comprises treating said waters with an effective amount for the purpose of inhibiting amorphous silica scale formatin of boric acid and/or its water-soluble salts.

The method of inhibiting amorphous silica scale formation on surfaces in contact with industrial waters containing dissolved silica includes, but is not limited to, the inhibition of these types of amorphous silica scales on heat exchange surfaces in contact with industrial waters containing silica. Of primary concern is a method of inhibiting amorphous silica scale formation on heat exchange surfaces in contact with alkaline industrial waters containing silica and having a pH greater than 5.0 which comprises treating these alkaline waters with an effective amount of boric acid and/or its water-soluble salts.

The boric acid used may be effectively combined with other chemical treatment programs designed to inhibit corrosion and/or designed to inhibit other types of chemical scale formation by either the use of a chelating program, a scale inhibition program using threshold agents for dispersion and crystal modification, or the use of organic or inorganic water-soluble corrosion inhibitors such as zinc, chromium, phosphonate, orthophosphate, polyphosphate, and the like. The treatment programs which include boric acid and its water-soluble salts may also contain nonionic, cationic, or anionic surface-active agents and/or low molecular weight polymers used as threshold agents, dispersants, and the like.

The boric acid and/or its water-soluble salts may be used at concentrations of at least 10.0 ppm, as boric acid. The preferred concentration is at least 25.0 ppm, as boric acid, and the most preferred concentration is at least 50.0 ppm, as boric acid. Boric acid dissolves to form the orthoborate ion which apparently must be present to show activity in regards to inhibition of silica scales and precipitates.

The water-soluble salts of boric acid include, but are not limited to, lithium, sodium, potassium, ammonium, and quaternary ammonium salts and may also include alkaline earth metal salts, aluminum salts, and transition metal salts if the presence of these types of cations can be tolerated in the industrial waters being treated.

The industrial waters requiring treatment usually have a pH in the range of 5.0–10.0 and above, and also contain at least 5.0 ppm total silica, but most typically contain total silica levels of at least 25.0 ppm and higher. The formation of amorphous silica scale from these waters is normally exaggerated when the industrial waters are alkaline, said waters having a pH exceeding 7.0. As alkalinity increases, the tendency for amorphous silica scale and deposition to occur is exaggerated. The successful treatment of alkaline industrial waters having a pH of at least 8.0 is accomplished by treating these waters with at least 5.0 ppm, and preferably at least 25.0 ppm, of boric acid, its water-soluble salts or other boron compounds which dissolve or hydrolyze in these waters to form the orthoborate ion species.

In addition to the above mentioned phenomenon, the system to effectively inhibit amorphous silica scale formation should also be essentially immune to the effects of calcium hardness and magnesium hardness, since the presence of these hardness-containing cations often exaggerates the silica formation or forms a different type of scale from precipitates of either calcium and/or magnesium silicates. When these two types of scales are formed simultaneously, that is, a hardness silicate scale with an amorphous silica scale, the problems can even further be exaggerated. It is, therefore, important that a treatment system be effective in the presence of these hardness-containing waters.

Further discussion of my invention is presented in the form of the following experiments:

EXAMPLES

A series of screening test studies were made to quantify the degree of activity available from boric acid and its water-soluble salts. These tests were conducted in the presence and/or absence of other treating formulations as mentioned above. The test procedure used to screen candidate treatment programs is as follows:

Fifty ml. of a 1% sodium metasilicate solution as ($SiO_2$) is passed through a strong cation exchange column into a 3 necked round bottom flask containing 300 ml. of water under reflux. The flask will also contain calcium hardness and any desired chemical treatment. The column is eluted with 100 ml. distilled water; the pH is adjusted from 4–5 to 8.2–8.3 with 1% NaOH and a final 50 ml. of distilled water eluted through the column. The result is a reactor containing 500 ml. of solution with 500 ppm silicic acid as $SiO_2$, 300 ppm $Ca^{2+}$ as $CaCO_3$ and a test treatment at typically 100 ppm actives.

After heating for one hour under reflux, the solution is cooled overnight. The next day, after physical observations are made, part of the solution is filtered and both filtered and unfiltered samples are analyzed for total $SiO_2$ by AA and reactive (soluble) silica.

A blank, depending on the final pH, will give up to 150 ppm reactive silica and a total silica of about 200 ppm. Moderate activity is associated with a total filtered silica value of approximately 250 ppm $SiO_2$. High activity is associated with silica values of at least 300 ppm $SiO_2$. Treatments which allow obviously visible film scale on the reactor walls are severely downgraded. This is most likely to occur with treatments of modest activity.

In developing this test protocol, a number of variables were carefully considered to make sure that the procedure would conform and predict known chemistry, especially in regard to the blank. Table I shows the expected/theoretical solubility values for silica for a variety of pH conditions. Table II gives the results with the test apparatus. The data in Table II compares favorably with the expected values. Further analysis of the precipitate by x-ray confirm the presence of amorphous silica.

The effects of calcium hardness and pH were evaluated and the pertinent data are given in Table III. As predicted theoretically, condensation of the silicic acid to amorphous silica does not occur under acidic (pH-4) conditions. The reaction is driven by alkalinity. So that results could be obtained within a reasonable length of time, a pH of 8.2–8.3 was chosen for the screening test. However, the results would be expected to apply to any industrial water having a pH range between 5.0–10.0 or above and a total silica concentration (as $SiO_2$) of at least 25 ppm.

At a pH of 8.3, condensation goes rapidly and a readily filterable silica is obtained. As expected, the calcium at the level chosen had no effect on the condensation of the silica. The effect of the Ca is one of interference on the activity of the chemical treatment. A level of 300 ppm Ca as $CaCO_3$ is not unusual in cooling water applications and, in fact, is considered moderate.

Tables IV and V illustrate the effect of alkalinity on precipitated amorphous silica particle size. At a starting pH of 7.6 condensation is complete but the particles are generally too small for effective filtration by a 0.45 milipore filter. This is another reason for using a starting pH of 8.3 in the screening test above.

The data in Tables IV and V also highlight an interesting analytical fact. By successively filtering through smaller millipore filters, it was noted that a reasonable estimation of the amount of reactive silica in solution can be obtained using AA. This is done by measuring the solution with AA after filtering through a 0.1 micron milipore and subtracting 10%.

Since boric acid was found to be effective for inhibiting silica and as boron is immediately diagonal to silicon in the periodic table, the question was raised about false analytical results involving boron and silicon. Table VI shows that there is no analytical interference involving either boron or silicon by both AA and the reactive molybdate test method.

TABLE I

Theoretical Silica Solubility Limits

| pH | Solubility of Amorphous Silica* at 25° C. (ppm) |
|---|---|
| 6-8 | 120** |
| 9 | 138 |
| 9.5 | 180 |
| 10 | 310 |
| 10.6 | 876 |

*Source - The Chemistry of Silica by Ralph K. Iler.
**At 100° C., the solubility of silica is about 500 ppm $SiO_2$, and this is the basis for starting the reactions under boiling conditions.

TABLE II

EFFECT OF pH ON SILICA BLANK SCREENING RESULTS
(Standard Conditions with 300 ppm $CaCO_3$)

| ml 1% NaOH | pH initial | pH final | Total $SiO_2$ - ppm (after filtering through 0.45 milipore) |
|---|---|---|---|
| 1.6 | 8.3 | 9.1 | 170 |
| 1.6 | 8.29 | 9.05 | 170 |
| 2.0 | 8.36 | 9.18 | 200 |
| 2.0 | 8.38 | 9.22 | 210 |
| 2.1 | 8.41 | 9.21 | 230 |
| 3.0 | 8.64 | 9.40 | 270 |
| 2.5+ | 8.6 | 9.4 | 260 |

TABLE III

EFFECT OF $CA^{2+}$ AND pH ON CONDENSATION OF SILICA

| $Ca^{2+}$ m $CaCO_3$ | Temperature C.° | pH Initial | pH Final | ppm $SiO_2$ Soluble (Reactive) | ppm $SiO_2$ Total (AA) |
|---|---|---|---|---|---|
| None | 100 | 7.8 | 8.6 | 150 | 470 |
| 300 | 100 | 4.4 | 4.3 | 460 | 470 |

TABLE IV

WATER ANALYSIS

| Number | Sample Marked | Soluble $SiO_2$ | Total $SiO_2$ |
|---|---|---|---|
| 1. | No filtering | 150. | 410. |
| 2. | 0.45 Millipore | 170. | 300. |
| 3. | 0.1 Millipore | 170. | 200. |
| 4. | 0.1 Sintered Glass | 170. | 180. |

TABLE V

EFFECT OF AMORPHOUS SILICA PARTICLE SIZE ON SILICA ANALYSIS

| Filtering Condition | ppm $SiO_2$ Soluble Silica (Reactive) | ppm $SiO_2$ Total Silica (AA) |
|---|---|---|
| through 0.45 milipore | 120 | 400 |
| through 0.10 milipore | 120 | 160 |
| through both | 120 | 200 |
| Initial Hot no filtering | 410 (some time delay ~½ hour) | 515 |
| no filtering | 150 | 410 |
| through 0.45 milipore | 170 | 300 |
| through 0.10 milipore | 170 | 190 |

TABLE VI

EFFECT OF BORIC ACID ON SILICA ANALYSIS - STANDARD CONDITIONS

| $Ca^{2+}$ m $CaCO_3$ | Temperature C.° | pH Initial | pH Final | ppm $SiO_2$ Soluble (Reactive) | ppm $SiO_2$ Total (AA) | ppm $H_3BO_3$ |
|---|---|---|---|---|---|---|
| 300 | 100 | 4.4 | 4.3 | 460 | 470 | None |
| 300 | 100 | 4.4 | 4.3 | 460 | 480 | 100 |

RESULTS

The data indicated in the Tables and diagrams presented is conclusive in defining two specific categories of chemical treatment agents which may be useful in controlling and/or inhibiting silica scale deposition on surfaces in contact with industrial waters containing dissolved silica. These two categories are, primarily, boric acid and its water-soluble salts and/or (2) boron compounds which may readily form boric acid or its water-soluble salts by hydrolysis under the industrial water conditions. Table VII and VIII compare the activity of boric acid and a variety of boron-containing compounds. It also contains data for aluminum citrate which is referenced by many authors as being useful as a dispersant for silica in aqueous media. The data indicates clearly that only the orthoborate ion producing compounds or boron compounds which give orthoboric ions on hydrolysis are truly active. Polymeric boron compounds show no evidence of significant activity in the tests defined above.

Table IX is presented to outline further results obtained using this screening test.

TABLE VII

Efficacy of Boron Compounds for Silica Control Screening Test
(Theoretical Input Silica - 500 ppm $SiO_2$)

| Chemical Name** | Structure | Molecular weight | Total Silica* (ppm $SiO_2$) |
|---|---|---|---|
| Boric acid | $B(OH)_3$ | 61.8 | 330-390 |
| Borontrifluoride ethyl-amine complex | $BF_3 \cdot C_2H_5NH_2$ | 112.8 | 360 |
| Fluoboric acid | $HBF_4$ | 104.8 | 380 |
| Sodium metaborate-tetrahydrate | $Na_2B_2O_4$—$4H_2O$ | 203.7 | 170 with extremely, slow filtering |
| Sodium tetraborate-pentahydrate | $Na_2B_4O_7 \cdot 5H_2O$ | 291.3 | 210 |
| Aluminum Citrate | $Al(C_6H_8O_7)$ | — | 210 |
| Polybor (sodium octa-borate tetrahydrate) | $Na_2B_8O_{13} \cdot 4H_2O$ | 412.5 | 190 |
| Blank final pH- 9.0-9.1 | — | — | 170 |
| Blank final pH ~9.2 | — | — | 200-230 |
| Theoretical at pH 6-8 | — | — | 120 |
| Theoretical at pH 9 | — | — | 138 |
| Theoretical at pH 9.5 | — | — | 180 |

*Total silica is analyzed by AA after filtering through 0.45 micron milipore filter.
**All Boron compounds tested at equivalent to 100 ppm Boric acid.

TABLE VIII

EFFECT OF BORIC ACID ON $SiO_2$ INHIBITION SCREENING TESTS

| ppm Treatment | Temperature C.° | ppm $Ca^{2+}$ as $CaCO_3$ | pH Initial | pH Final | ppm $SiO_2$ Soluble (Reactive) | ppm $SiO_2$ Total by AA |
|---|---|---|---|---|---|---|
| None | 100 | 300 | 8.4 | 9.21 | U - 170 F - 200 | U - 330 F - 230 |
| 100 | 100 | 300 | 8.2+ | 8.85 | U - 140 F - 130 | U - 400 F - 390 |
| 100 | 100 | 300 | 8.4 | — | U - 150 | U - 310 |

TABLE VIII-continued

EFFECT OF BORIC ACID ON $SiO_2$ INHIBITION SCREENING TESTS

| ppm Treatment | Temperature C.° | ppm $Ca^{2+}$ as $CaCO_3$ | pH Initial | pH Final | ppm $SiO_2$ Soluble (Reactive) | ppm $SiO_2$ Total by AA |
|---|---|---|---|---|---|---|
| | | | | | F - 140 | F - 330 |

U - Unfiltered
F - Filtered through 0.45 milipore

TABLE IX

Silica Inhibition Screening Data

| Chemical Treatment (100 ppm Actives) | Total Silica Filtered (ppm $SiO_2$) |
|---|---|
| 1. 100 ppm $H_3BO_3$ + 150 ppm Glycerine | 410 |
| 2. $H_3BO_3$ | 390 |
| 3. $HBF_4$ | 380 |
| 4. $BF_3$Ethylamine complex | 360 |
| 5. 100 ppm $H_3BO_3$ + 293 ppm Mannitol | 350 |
| 6. Boric Acid | 330 |
| 7. N—Ethylamine monoethanolamine | 290 |
| 8. Monoethanolamine | 290 |
| 9. Diethanolamine | 290 |
| 10. Ethylene diamine | 290 |
| 11. 125 ppm $H_3BO_3$ | 290 |
| 12. Triethylenetetramine | 280 |
| 13. Ethylene glycol | 280 |
| 14. ARQUAD 16/50 (Trimethylhexadecylammonium chloride) | 270 |
| 15. Bix-hexamethylene triamine | 270 |
| 16. 1,5-hexamethylenediamine | 270 |
| 17. Glycerine | 260 |
| 18. A polyimine of approx. 2000 MW | 260 |
| 19. Tetramethylammonium chloride | 255 |
| 20. Bis(2-Hydroxyethyl)Cocoamine oxide | 250 |
| 21. TETRONIC 1501 (EO/PO Block polymer from ethylene diamine, MW-7,900) | 250 |
| 22. Tris (hydroxymethyl) aminomethane | 250 |
| 23. AROMOX DMC 39% (Dimethylcocoamine oxide) | 250 |
| 24. LONZA POLYOL 7000 (Hydrogenated polymaltitol, 75% tetramer or higher) | 250 |
| 25. N—(2 Hydroxy-1,1-Bis hydroxyethyl) ethyl taurine | 240 |
| 26. N—(Tris hydroxymethyl) Methylglycine | 240 |
| 27. PLURONIC L-121 (EO/PO Block polymer, MW-4400) | 240 |
| 28. GOODRITE K-752 (2,000 MW poly acrylic acid) | 240 |
| 29. ETHOQUAD C/25 (Methylpolyoxyethylene (15) cocoammonium chloride | 240 |
| 30. A polyimine of approx. 75,000 MW | 240 |
| 31. PLURONIC 17R1 (PO/EO Block polymer MW-1700) | 240 |
| 32. PLURONIC 21R1 (PO/EO Block polymer, MW-3250) | 240 |
| 33. Tetraethylenepetamine | 240 |
| 34. LONZA POLYOL 3070 (Hydrogenated polymaltitul, 50-75% tetramer or higher) | 240 |
| 35. PLURONIC F-38 (EO/PO Block polymer, MW-4700) | 230 |
| 36. PLURONIC L-61 (EO/PO Block polymer, MW-2000) | 230 |
| 37. Tris (hydroxymethyl) aminomethane | 230 |
| 38. Mannitol | 230 |
| 39. Sorbitol | 230 |
| 40. Tetronic 50RI | 220 |
| 41. Pluronic L-31 (EO/PO Block polymer, MW-1100) | 220 |
| 42. N,N—Diethyl ethanol amine | 220 |
| 43. (N,N,N',N'—tetrakis (2-hydroxypropyl) ethylene diamine | 210 |
| 44. Borax pentahydrate | 210 |
| 45. TETRONIC 908 (EO/PO block polymer from ethylene diamine, MW-2500) | 210 |
| 46. TETRONIC 304 (EO/PO block polymer from ethylene diamine, MW-1650) | 210 |
| 47. Pentaerythritol | 210 |
| 48. A polyimine of approx. 50,000 MW | 210 |
| 49. Aluminum citrate | 210 |
| 50. TETRONIC 50R8 (PO/EO Block polymer from ethylene diamine, MW-10,2000) | 200 |
| 51. Borax pentahydrate | 200 |
| 52. N,N,N,N—tetrakis (hydroxyethyl) ethylene diamine | 200 |
| 53. Triethanolamine | 200 |
| 54. 50 ppm $H_3BO_3$ + 75 ppm glycerine | 200 |
| 55. 2-nitro-2-ethyl-1,3 propanediol | 190 |
| 56. (50,000 MW 1:3 acrylamide/acrylic acid polymer) | 190 |
| 57. 10,000 MW 3:1 acrylamide/acrylic acid polymer | 190 |
| 58. Polybor (sodium octaborate $4H_2O$) | 190 |
| 59. (CORCAT P-18 (Linear 1,800 MW polyimine) | 190 |
| 60. Triethanolamine ester boric acid (as 100 ppm $H_3BO_3$) | 190 |
| 61. Tris (hydroxymethyl) nitromethane | 180 |
| 62. Methyl quaternized polyimine of approx. 25,000 MW | 180 |
| 63. Monoethanolamine ester boric acid (as 100 ppm $H_3BO_3$) | 180 |
| 64. 50 ppm $H_3BO_3$ + 146 ppm mannitol | 180 |
| 65. Sodium metaborate $.4H_2O$ | 170 |

PCT TESTS

Figure 2:
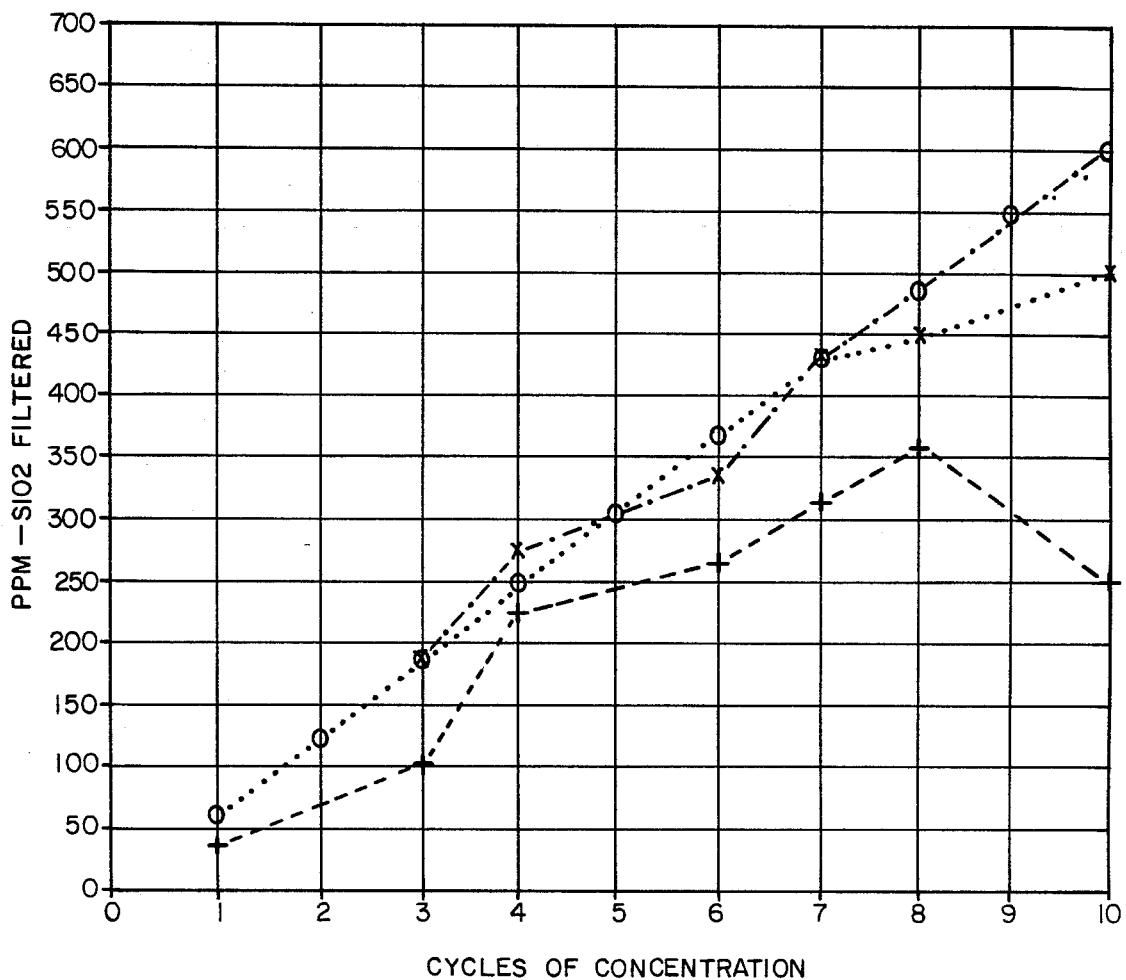

In addition, pilot cooling tower tests were run on certain formulations, for all of the tests in the pilot cooling tower study, a high silica make-up water was used. The general composition of the make-up water is as follows:

$Ca^{2+}$ as $CaCO_3$—60 ppm
$Mg^{2+}$ as $CaCO_3$—26 ppm
Silica as $SiO_2$—61 ppm
$HCO^-_3$ as $CaCO_3$—130 ppm The pilot cooling tower was operated with 8 tubes of mixed metallurgy and under a heat load created by 8-500 watt heaters. It was operated with a standard corrosion chrome-zinc treatment program at a pH of 7±0.2. FIG. 1 shows that the untreated water deviated from total mass balance when the total filtered silica concentration reached approximately 280 ppm $SiO_2$ with a maximum reactive silica leval of about 225 ppm $SiO_2$. FIG. 2 shows that when the same system was operated with approximately 30 ppm boric acid present in the recirculating waters, mass balance on silica did not deviate with respect to the total silica until approximately 450 ppm $SiO_2$. Further, over 350 ppm reactive $SiO_2$ was attained. The most striking feature in common among the categories of silica chemical treatments involved the fact that boric acid and/or boron compounds which hydrolyzed to form boric acid are necessary to provide efficacy. Preferably boron compounds should be in an orthoborate ionic form. The molecular weights of these boron-containing compounds should be below 500 and, preferably, is below 200.

It is interesting to note that in the presence of boric acid and/or its precursors and salts, the screening test solutions containing silica precursors do not impart a Tyndall beam which indicates that no colloidal formation of silica is occurring. In addition, in the presence of boric acid, pH does not inncrease as rapidly as it would normally be expected to increase if silica colloids are being formed.

Having described my invention, I claim:

1. A method of inhibiting amorphous silica scale formation on surfaces in contact with industrial waters containing dissolved silicates which comprises, at a pH of at least 5.0, treating said waters with an effective amount for the purpose of inhibiting amorphous silica scale, of a boron compound which forms orthoborate ion when dissolved in or hydrolyzed by said waters.

2. The method of claim 1 wherein the industrial waters are recirculating cooling waters.

3. The method of claim 1 wherein the industrial waters contain at least 5.0 ppm silica as $SiO_2$.

4. The method of claim 1 wherein the industrial waters are treated with at least 5.0 ppm boric acid.

5. The method of claim 1 in which the industrial waters have a pH exceeding 5.0 and are treated with boric acid at a concentration of at least 50 ppm.

6. A method of inhibiting amorphous silica scale formation on metal surfaces in contact with alkaline industrial cooling waters having a pH of at least 5.0 which comprises treating said cooling waters with at least 5.0 ppm boric acid and its water-soluble salts, to produce an effective amount of orthoborate ion for the purpose of inhibiting amorphous silica scale.

7. A method of inhibiting amorphous silica scale formation on metal surfaces in contact with recirculating alkaline industrial cooling waters having a pH of at least 7.0 which comprises treating said cooling waters with at least 25.0 ppm of a boron compound which dissolves in or hydrolyzes in said water to give an effective amount of orthoborate ion for the purpose of inhibiting said amorphous silica scale formation.

8. A method of inhibiting amorphous silica scale formation in cooling waters containing industrial corrosion treatment chemicals selected from the group consisting of water-soluble chromium salts, water-soluble zinc salts, water-soluble phosphonates, water-soluble orthophosphates, water-soluble polyphosphates and combinations thereof which comprises treating the cooling waters at a pH of at least 5.0 with at least 25.0 ppm of a boron compound which dissolves in or hydrolyzes in said water to give an effective amount of orthoborate ion for the purpose of inhibiting said amorphous silica scale formation.

* * * * *